Figure 1:
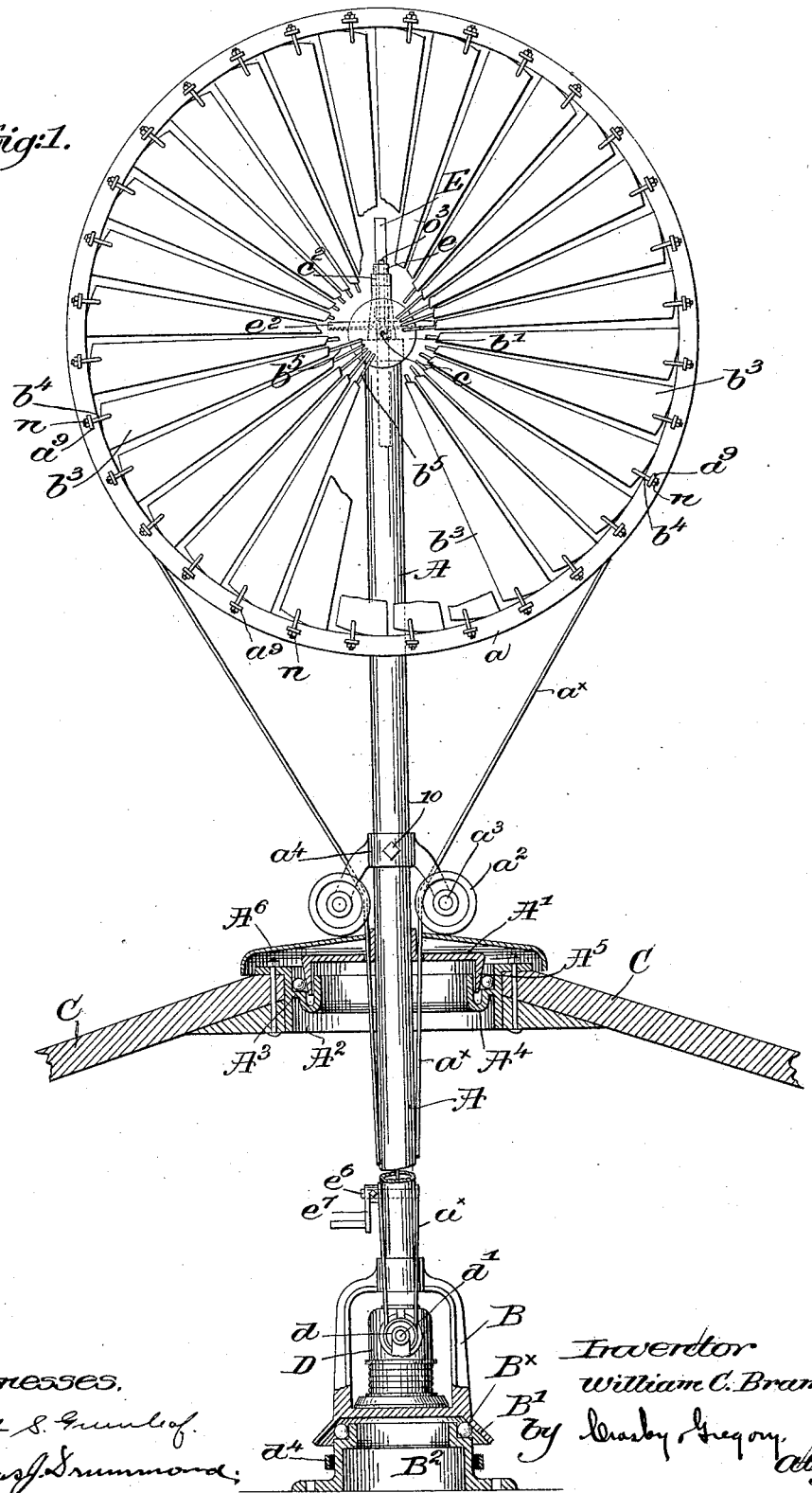

(No Model.) W. C. BRAMWELL.
WINDMILL.

No. 556,803. Patented Mar. 24, 1896.

Witnesses.
Fred S. Greenleaf.
Thomas J. Drummond.

Inventor
William C. Bramwell.
By Crosby & Gregory
Attys

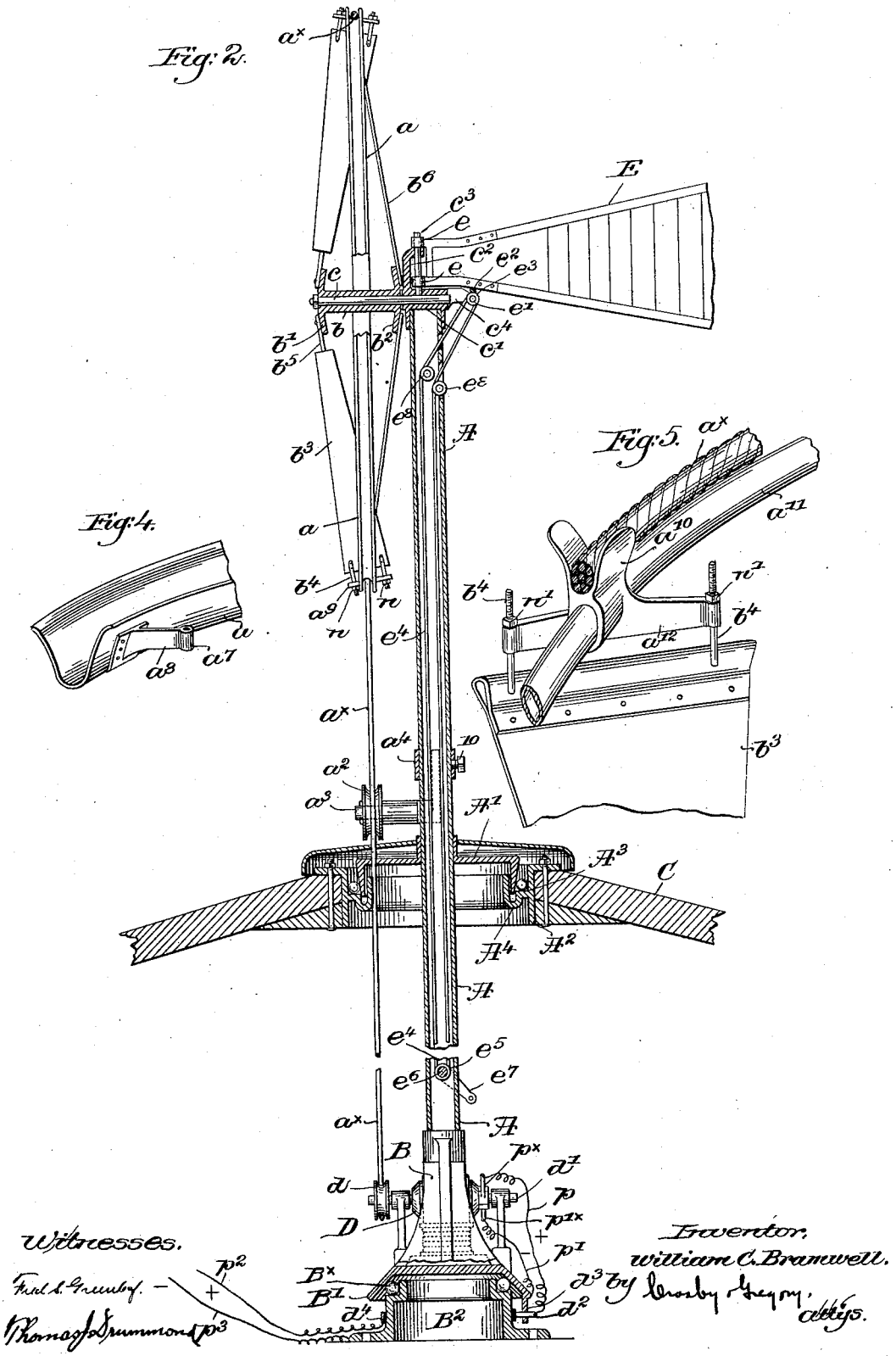

(No Model.) W. C. BRAMWELL. 3 Sheets—Sheet 3.
WINDMILL.
No. 556,803. Patented Mar. 24, 1896.
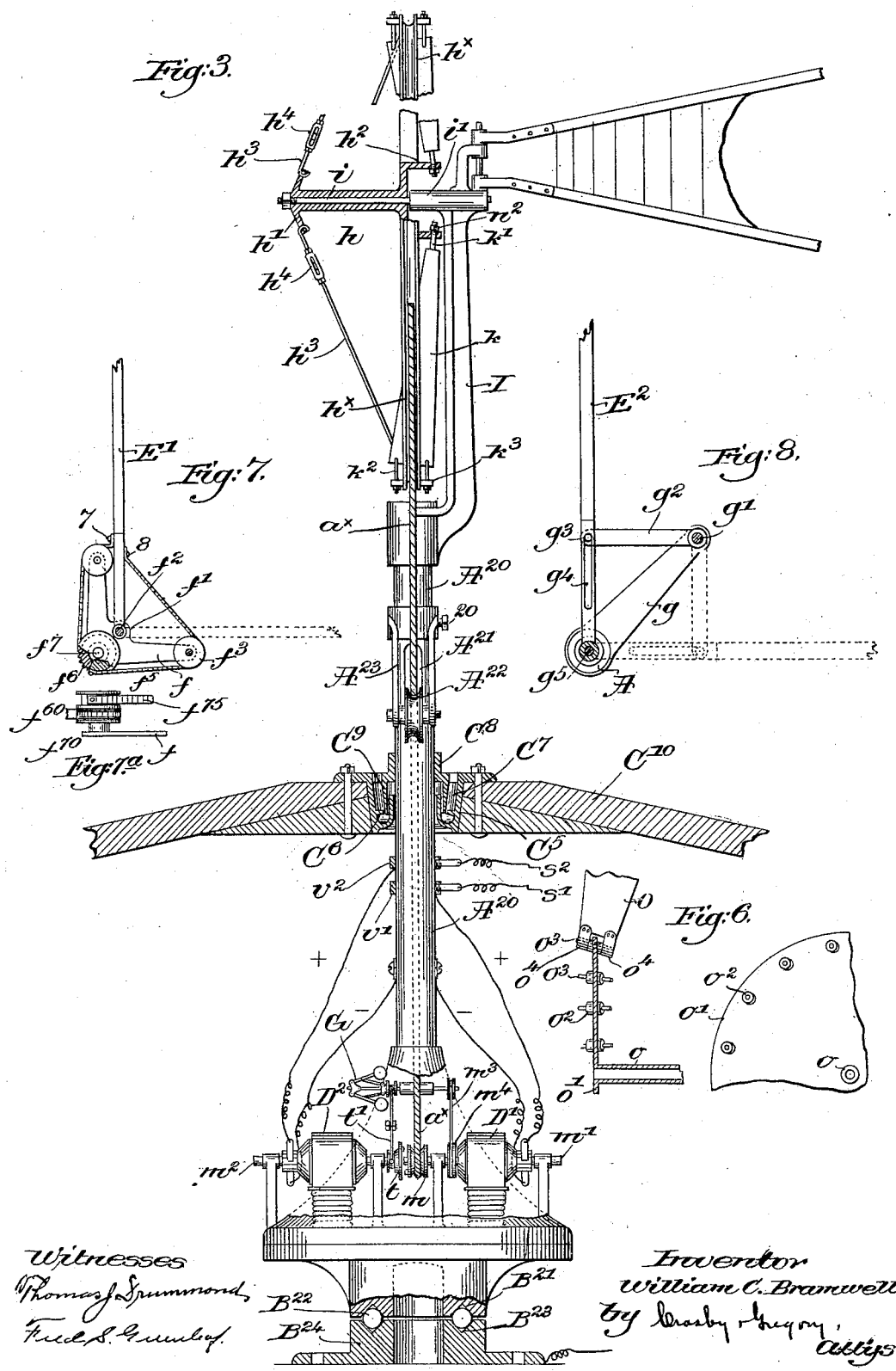
Witnesses
Thomas J. Drummond
Fred S. Greenleaf
Inventor
William C. Bramwell
by Crosby & Gregory,
Attys.

UNITED STATES PATENT OFFICE.

WILLIAM C. BRAMWELL, OF HYDE PARK, MASSACHUSETTS.

WINDMILL.

SPECIFICATION forming part of Letters Patent No. 556,803, dated March 24, 1896.

Application filed March 28, 1895. Serial No. 543,514. (No model.)

*To all whom it may concern:*

Be it known that I, WILLIAM C. BRAMWELL, of Hyde Park, county of Norfolk, State of Massachusetts, have invented an Improvement in Windmills, of which the following description, in connection with the accompanying drawings, is a specification, like letters and numerals on the drawings representing like parts.

This invention has for its object the production of a wind-wheel adapted to transmit its power from or adjacent its rim to a suitable mechanism located within the windmill building without necessitating the rotation of the entire building, or the location of the mechanism to be driven upon its exterior. It has long been a problem of considerable magnitude to accomplish this end in a practical manner, and so far as I am aware it has never heretofore been accomplished in any form whatever.

When machinery located within a windmill building has heretofore been driven from a wind-wheel, the power has been transmitted from a shaft of the wheel by beveled gears in connection with a vertical shaft, and the latter has in turn driven the desired machinery within the building by other beveled gears. With this arrangement the loss of power is so great that the power of the wind-wheel is dissipated to a very large extent in overcoming the consequent friction and inertia of the parts. If the power is taken from the rim, considerable difficulty is encountered, for as the wind changes the position of the wheel changes about its vertical support, and the mechanism to be driven must necessarily travel in unison therewith, either fixed to the same vertical support outside of the building, or if inside then the whole building must rotate, and in this invention I have overcome all of the foregoing objections in a simple and efficient manner. In practice it is most advantageous to drive from the rim instead of from the shaft of the wind-wheel for two reasons, viz: First, the peripheral speed of the rim at once renders unnecessary all intermediate speed-increasing devices, which must be employed when the slow-moving shaft is used to transmit the power; secondly, there is no tendency of the wheel to turn out of the wind, as is the case with beveled gears connected to the shaft, as in this instance the larger beveled gear attached to the wheel-shaft, in its effort to turn the smaller one on the vertical shaft, will partially rotate the wheel around its vertical axis, thereby taking it out of the wind and losing power.

My invention consists of various details of construction and arrangement to be hereinafter described and particularly pointed out in the claims.

Figure 1 is a front elevation of a wind-wheel arranged to drive an electric generator and embodying my invention, the vertical support being broken out to save space, and a portion of the blade being omitted. Fig. 2 is a side elevation of the mechanism shown in Fig. 1. Fig. 3 is a similar view, partially broken out, of a modified form of apparatus, the driving band or rope being shown within the standard and arranged to drive two generators. Fig. 4 is an enlarged detail of the semicircular rim with the holder attached thereto. Fig. 5 is an enlarged detail of a modified form of rim and band or rope holder. Fig. 6 represents details of the disk and a portion of the blade; and Figs. 7, $7^a$, and 8 are details of modified forms of vane-operating mechanism.

Referring to Figs. 1 and 2, I have herein shown a hollow vertical rotative standard A supporting the driving and driven mechanism and provided with one member, A', of a ball-bearing in which it is journaled, the other member, $A^2$, of said bearing being secured in an opening in the roof C of the windmill building, the member $A^2$ having an annular ball-receiving raceway $A^3$. The foot of the standard has rigidly attached thereto a stirrup-like hollow casting B provided with an outwardly-inclined flange B' to rest upon a series of balls $B^\times$ in the raceway of a step-bearing $B^2$ secured to the top or other floor of said building.

A flexible connection, preferably a rope or band $a^\times$, or it may be a sprocket-chain, runs in a preferably semicircular grooved rim $a$, as in Figs. 1 and 2, or in forks $a^{10}$, Fig. 5, attached to the tubular or other rim, $a^{11}$, of the mill-wheel.

Guide-rolls $a^2$, grooved to receive the transmitting-band, are rotatably mounted on studs $a^3$, fixed to a suitable casting $a^4$, adjustably secured to the standard A by a set-screw 10, so that by raising the said casting on the standard the power-transmitting band $a$ can be tightened when necessary. The guide-rolls $a^2$ also serve to confine the rope near the standard, as in Figs. 1 and 2.

The connection $a$ passes through holes in the member $A'$ of the ball-bearing, and thence down to and around a pulley $d$ on the armature-shaft $d'$ of the electric generator or other machine, to thereby transmit the power of the wind-wheel directly from or adjacent the rim thereof.

The generator or dynamo D (shown in Figs. 1 and 2) is carried within the hollow or stirrup-like casting B, to the top of which is secured the vertical standard A, the part $B^2$ constituting the step-bearing of the whole structure, as shown.

The member $A^2$ of the ball-bearing is shown as an annular ring bolted to the roof C, and the annular ridge forming the raceway $A^3$ upon which the balls are placed is turned downward and then upward, forming an annular groove $A^4$ to receive grease or oil.

The member $A'$ secured to the standard has a downturned flange having an outer beveled face $A^5$ to press against the balls, so that wear can be compensated for by lowering the said member $A'$ within the ring of balls.

A cover $A^6$ is preferably mounted above the member $A'$ to protect the bearing from snow or rain.

In Figs. 1 and 2 I have represented the wind-wheel as comprising a hub $b$, provided with flanges $b'$ $b^2$, the hub and the rim $a$ being connected by a series of preferably thin metallic blades $b^3$ by means of threaded rods $b^4$ secured to the outer end of the blades and passing through holes in holders $a^9$ attached to the rim $a$ and held in place therein and tightened by suitable nuts $n$, the inner ends of the blades being secured by rods $b^5$ to the outer flange $b'$ of the hub, as shown in Figs. 1 and 2, the said blades connecting the hub and rim under tension. As best shown in Fig. 2, the blades are thus brought to the front of the wheel at an angle with the vertical plane of the rim, and a number of lateral braces $b^6$ are secured at their inner ends to the flange $b^2$ of the hub and at their outer ends to the frame and tightened, producing thereby a very strong, rigid, and true wheel of very light weight.

In Fig. 4 a slightly different form of holder $a^8$ is shown as bolted or riveted to the rim $a$ and provided with a thimble $a^7$, through which one of the threaded rods $b^4$ on the outer end of the blade passes, it being understood that for each blade two of such holders are provided, secured to opposite sides of the rim and set at the proper angle to the plane thereof.

The hub $b$ of the wind-wheel is mounted to rotate upon a stud or pin $c$, (see Fig. 2,) secured in a casting $c'$ attached to the standard A and provided with a bracket-like arm $c^2$ to receive a pintle $c^3$, upon which is pivotally mounted by suitable bearings $e$ a vane E, the said casting also having an arm $c^4$ to support a worm-shaft $e'$ in engagement with the inner toothed edge of a segmental worm-gear $e^2$ secured to the vane E. (Partially shown in Figs. 1 and 2.)

A sprocket or other wheel $e^3$ on the worm-shaft $e'$ is connected by a band or chain $e^4$ with a wheel $e^5$ mounted within the standard A of the shaft $e^6$ provided with an external handle $e^7$, rotation of the handle through the connection $e^4$ rotating the worm-shaft $e'$ and moving the vane laterally in one direction or the other upon its pintle $c^3$, the connection $e^4$ being preferably led into the standard A near its upper end and over guide-rolls $e^8$ and thence down to the wheel $e^5$, to thus protect said connection from the weather and also to prevent its possible interference with other parts.

In Fig. 7 I have shown a modified form of vane-support and operating mechanism, the support consisting of a two-armed casting $f$ secured to the standard and having ears $f'$ to receive the pintle $f^2$ of the vane $E'$. The arms have mounted thereon, preferably at their extremities, rotatable guide-rolls $f^3$ $f^4$, about which is passed a band or chain $f^5$ secured at its ends at 7 and 8 to opposite sides of the vane. The band $f^5$ is passed around an actuating chain or pulley $f^6$ fixed to a rod or shaft $f^7$, either passed through the standard or exterior and parallel thereto and of a sufficient length to extend downward to any convenient place to be provided with a suitable handle or hand-wheel, by which it may be rotated to change the angle of the vane.

Instead of simply passing the band $f^5$ around the actuating-chain $f^6$, it could be severed and secured to the roll $f^{60}$, (see Fig. 7ª,) to be wound thereon in opposite directions, as at $f^{70}$ and $f^{75}$, so that rotation of the roll $f^{60}$ will positively wind one portion and unwind the other portion of the band, thereby turning the vane.

In the modification shown in Fig. 8 a casting G is fixed to and projects laterally from the standard below the vane, said casting having at its outer end a bearing for the shaft $g'$, extended downward to any desired height and having secured thereto an arm $g^2$ connected by a pin $g^3$ to the vane $E'$, the said pin entering a slot $g^4$ therein, whereby rotation of the shaft $g'$ will swing the arm $g^2$ and through the slot-and-pin connection will alter the angle of the vane $E^2$ according to the amount of rotation given to the shaft. The vane is shown as mounted on a pintle $g^5$, which may be attached either to the casting $g$ or to the standard.

When the vane is in the full or the dotted line position, Fig. 8, it is locked therein, the arm $g^2$ at such time being substantially at right angles to the vane, so that sudden change of wind cannot alter the position of the vane. Positive and negative wires $p$ $p'$ are connected to the brushes $p^×$ $p'^×$ of the dynamo, (see Fig. 1,) the wire $p$ conveying the current by a suitable brush $d^2$, mounted on a post $d^3$, secured to the member B' of the step-bearing, to a ring $d^4$, connected to but insulated from the stationary member $B^2$ of said bearing and thence by wire $p^2$ to any desired point. The negative wire $p'$ is connected to any suitable part of the metallic bearing (herein shown as to the member B') and the return-wire $p^2$ is attached to the stationary member $B^2$ of the bearing. By this construction there is no break in the current as the wind-wheel is turned on its vertical standard by changes in the direction of the wind.

In Fig. 5 the wheel-rim $a^{11}$ is shown as tubular, and it has secured thereto holders $a^{12}$, forked, as at $a^{10}$, to receive and guide the transmitting belt or band $a^\times$, the threaded rods $b^4$, connected to the outer ends of the blades $b^3$, being passed through suitable openings in the holders $a^{12}$ and held in place by nuts $n'$. The flanged holders $a^{10}$ obviate the necessity of using a semicircular grooved rim, as shown in Figs. 1, 2 and 4.

In Fig. 3 I have shown the hub $h$ of the wind-wheel as elongated and provided at its outer or front end with a preferably conical flange $h'$ and at its inner end with an annular outturned flange $h^2$, the latter having openings therein to receive the threaded rods $k'$ of the blades $k$ and held in place by nuts $n^2$, the outer ends of the said blades being connected by suitable threaded rods $k^2$ to holders $k^3$, secured to the rim $k^\times$. (Shown as semicircularly grooved to receive the power-transmitting band or cable $a^\times$.) In this instance the blades are inclined inwardly relatively to the plane of the rim of the wheel, and lateral braces $h^3$, provided with suitable tightening-turnbuckles $h^4$, are connected to the rim at their outer ends and at their inner ends to the flange $h'$ of the hub, so that when the blades and lateral braces are tightened the hub and rim are connected by members under tension, the lateral braces in Fig. 3 being shown as at a greater angle to the plane of the rim than is the case in Figs. 1 and 2.

The hub $h$ of the wheel is mounted to rotate upon a stud $i$, secured to a casting $i'$ on the top of an offset bracket I, secured to the hollow standard $A^{20}$ in such a manner as to bring the plane of the wheel-rim in alignment with the longitudinal center of the standard, whereby power-transmitting connection $a^\times$ is adapted to pass through openings $A^{21}$ to its interior, passing over guide-rolls $A^{22}$, only one of which is shown in Fig. 3, one such roller being located on each side of the standard and mounted in a casting $A^{23}$, secured to the standard, as by a suitable set-screw 20, the connecting-band $a^\times$ passing down through the standard to a pulley $m$ on an armature-shaft $m'$ of an electric generator B'.

In Fig. 3 the standard $A^{20}$ is mounted at its lower end upon a hollow casting $B^{20}$, (shown as broken out in Fig. 3 for the sake of clearness,) and having at its under side an annular raceway $B^{21}$ to receive the upper portions of a series of antifriction-balls $B^{22}$ placed in an annular groove $B^{23}$ of the step $B^{24}$ secured to the upper or other floor of the windmill building. In an opening in the roof $C^{10}$ of said building I have secured by suitable bolts an annular casting $C^5$ inwardly inclined and provided with an inturned flange $C^6$ to support the lower ends of a series of cylindrical rolls $C^7$, while a casting $C^8$ secured to the standard is provided with a depending annular flange $C^9$ to extend within the ring of rolls to form a roller-bearing for the standard between its ends.

Two dynamos D' and $D^2$ are shown in Fig. 3 as mounted on the base portion $B^{20}$, the dynamo D' being driven continuously so long as the wind-wheel rotates by means of the power-transmitting band $a^\times$, while the other dynamo, $D^2$, is thrown into and out of operation by means of an automatic clutch mechanism, the movable member $t$ of which rotates with but is longitudinally movable on the armature-shaft $m^2$ of the dynamo $D^2$, the said movable member being connected by a lever $t'$ with and to be supported by a centrifugal governor G driven by a belt $m^3$ connected to a pulley $m^4$ on the armature-shaft of the dynamo D'.

In light winds the dynamo D' furnishes the current; but when the speed thereof is increased sufficiently to cause the governor G to operate the clutch member $t$ the dynamo $D^2$ will be thrown into operation, the pulley $m$ on its shaft forming the other member of the clutch.

Each generator is preferably connected to a storage-battery or accumulator in well-known manner, the wires from the positive brushes conveying the current to rings $v'$ $v^2$, from which it is collected and carried off by wires $s'$ and $s^2$.

The negative wires of the dynamos are connected directly to the standard $A^{20}$ and lead thence to the accumulator. The normally idle dynamo $D^2$ thus serves as a brake to regulate the speed of the wind-wheel in strong winds, and at the same time it serves to store energy and prevent the waste of power.

In Fig. 6 I have shown a modified form of hub $o$, having a disk $o'$ at one end, the said disk having cast thereon on opposite faces the inclined hubs $o^2$, having longitudinal openings therethrough to receive the pins $o^3$, which are passed through the ears $o^4$ of the wind blades or sails O. The ears $o^4$ straddle the periphery of the disk, and when the pins $o^3$ are inserted through the hubs the proper angle is given to the inner ends of the blades.

From the foregoing description and the drawings it will be obvious that the wind-wheel, a portion of the power-transmitting band, and the guide-rolls therefor are the only portions of the apparatus exposed to the weather, so that there is no necessity for the operator to go outside of the building to regulate the movements of the mill.

All of the machinery to be driven is brought within the building, and the regulation stopping and starting of the mill can all be done from the interior.

I have by my construction herein shown eliminated all shafting and gearing for transmitting the power of the wind-wheel and increasing the speed of the driven mechanism, and I thus obtain mechanical power from the force of the wind without loss of efficiency and with great economy, simplicity, and consequent cheapness.

Although I have shown the wind-wheel as running loosely upon a stud or spindle secured to the standard, I may use instead thereof any form of ball or antifriction bearing which may be desirable.

My invention is not restricted to the precise construction and arrangement of parts as herein shown and described, for obviously the same may be modified or altered without departing from the spirit and scope of my invention.

I claim—

1. A wind-wheel, a hollow standard supporting it and rotative therewith, a building in which said standard is mounted to rotate, a flexible endless connection in engagement with and driven by said wheel and operating within said standard, and a speed-regulator or brake device for said wheel, the same consisting of a dynamo mounted to rotate with said standard and arranged to be automatically geared to said flexible connection when the speed reaches a predetermined rate, substantially as described.

2. A vertical rotative standard, a wind-wheel supported thereby, a bearing for the standard in or near the roof of the tower or other building, a step-bearing for the foot of the standard within the building, a plurality of dynamos mounted upon and to rotate with the standard, and direct connections between one of the dynamos and the wind-wheel, a normally inoperative clutch between said dynamos, and means to automatically operate the clutch controlled by the speed of the wind-wheel, substantially as described.

3. A wind-wheel comprising a hub, a rim, a series of thin metallic blades under tension connecting the rim and one end of the hub, lateral tension-braces connecting the rim and the other end of the hub, the blades and braces being located at opposite angles to the plane of the rim, and means to adjust the tension of the blades and braces, substantially as described.

4. A wind-wheel comprising an elongated hub, a flange at each end thereof, a rim, a series of thin metallic blades under tension connecting the rim and one of the flanges of the hub, the blades being inclined toward the plane of the rim, and lateral tension-braces connecting the rim and the other flange of the hub, substantially as described.

5. In a wind-wheel, a hub having at one end a disk provided near its periphery with a series of hollow bosses at an angle to the disk, a rim, and a series of wind-blades connected at their outer ends to the rim and at their inner ends to said bosses, substantially as described.

6. In a wind-wheel, a rim, a series of holders for the outer ends of the blades, secured to said rim and provided with bifurcated extensions projecting above the rim, substantially as described.

7. In a windmill, a vertical rotative standard, a wind-vane pivotally mounted thereon, an actuating-shaft supported parallel to the standard, an arm fast on the upper end of said shaft below the vane, and a slot-and-pin connection between the outer end of the arm and the vane, rotation of the shaft moving the vane and locking it in extreme positions, substantially as described.

8. In a windmill, a building having a windmill-standard passed therethrough and journaled in the roof thereof, said journal comprising a race member having a bottom and side walled raceway or ball-bearing and an upturned inner flange concentric therewith, so as to form a groove therebetween, and a standard member having a depending outer flange provided with a beveled outer face arranged to bear against balls or rolls provided in said raceway, substantially as described.

In testimony whereof I have signed my name to this specification in the presence of two subscribing witnesses.

WILLIAM C. BRAMWELL.

Witnesses:
JAMES McKAY,
JOHN B. LELAND.